United States Patent [19]

Greenstreet

[11] 4,355,777
[45] Oct. 26, 1982

[54] VIBRATION ISOLATING SURFACE PROTECTOR WITH HIGH TRACTION PROPERTIES

[76] Inventor: James G. Greenstreet, 270 Fairmont Ave., Ottawa, Ontario, Canada, K1Y 1Y2

[21] Appl. No.: 313,410

[22] Filed: Oct. 21, 1981

Related U.S. Application Data

[63] Continuation of Ser. No. 58,652, Jul. 19, 1979, abandoned.

[30] Foreign Application Priority Data

Dec. 11, 1978 [CA] Canada ............................ 317670

[51] Int. Cl.³ ................................. A47B 91/00
[52] U.S. Cl. ................ 248/346; 248/188.9; 248/677
[58] Field of Search ............ 248/188.9, 633, 346, 248/346.1, 632, 634, 615, 677, 188.8; 267/140.1

[56] References Cited

U.S. PATENT DOCUMENTS

| | | | |
|---|---|---|---|
| 1,898,309 | 2/1933 | Noelting | 248/188.9 X |
| 2,301,420 | 11/1942 | Liabastre | 248/188.9 |
| 2,865,133 | 12/1958 | Hoven et al. | 248/188.9 |
| 3,138,893 | 6/1964 | Rupar | 248/346.1 |
| 3,213,963 | 10/1965 | Vogt | 248/188.9 X |
| 3,239,185 | 3/1966 | Sweeney et al. | 248/615 X |
| 3,477,674 | 11/1969 | Schaller | 248/615 |
| 4,005,858 | 2/1977 | Lochner | 267/140.1 X |

FOREIGN PATENT DOCUMENTS

| | | | |
|---|---|---|---|
| 1131943 | 3/1957 | France | 248/346 |
| 1284689 | 1/1962 | France | 248/615 |
| 340455 | 1/1932 | United Kingdom | 248/188.9 |
| 365353 | 1/1932 | United Kingdom | 248/188.9 |
| 1068467 | 5/1967 | United Kingdom | 248/188.9 |
| 1339204 | 11/1973 | United Kingdom | 248/615 |

*Primary Examiner*—J. Franklin Foss
*Attorney, Agent, or Firm*—Sughrue, Mion, Zinn, Macpeak and Seas

[57] ABSTRACT

This invention is related to a vibration isolating surface protector having high traction properties. A soft compliant substantially platelike foam cushion is bonded to a substantially rigid backing plate and the periphery of the cushion has an integrally coated compliant membrane. When an axial or oblique force is applied to the backing plate surface remote from the cushion, the cushion and membrane compress, yielding extraordinary traction properties.

3 Claims, 10 Drawing Figures

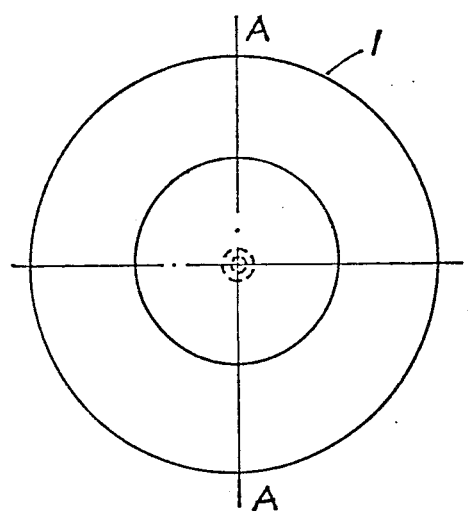
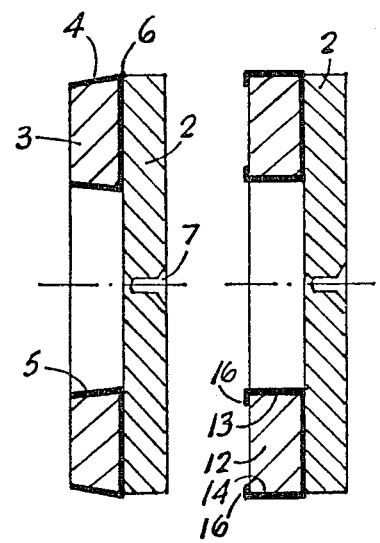
FIG. 1　　　FIG. 2　FIG. 6
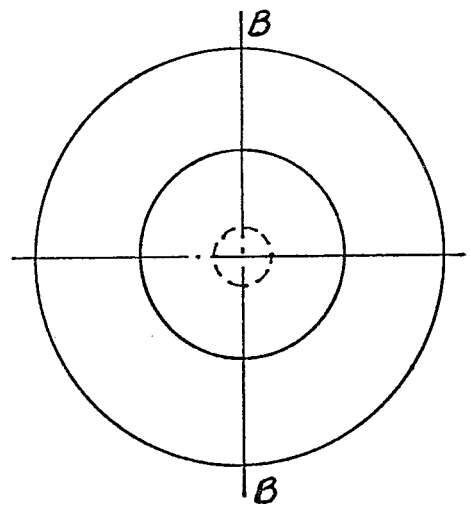
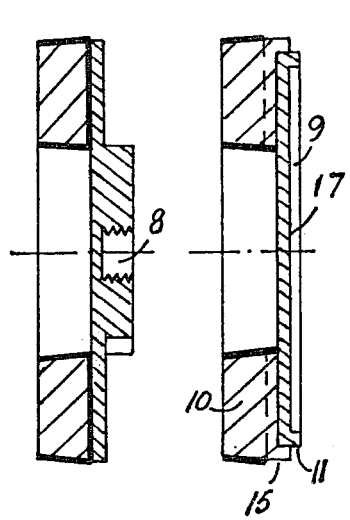
FIG. 3　　　FIG. 4　FIG. 5

VIBRATION ISOLATING SURFACE PROTECTOR WITH HIGH TRACTION PROPERTIES

This is a continuation of application Ser. No. 58,652, filed July 19, 1979 now abandoned.

BACKGROUND OF THE INVENTION

This invention is concerned primarily with a surface protection device having high traction properties and at the same time providing an acceptable degree of isolation in respect of vibration and shock.

The need for such a device has been apparent for more than 200 years in connection with the supporting spike of a violoncello and until my invention was made, this problem had not been satisfactorily resolved.

The existing practice has been for the musician to puncture a floor surface with the violoncello spike to effect an anchorage for the instrument, thus preventing slipping of the instrument but in so doing, damaging the floor surface. Alternatively, spike cups are in use and, while surface protection may be effected, such cups are prone to slipping unexpectedly on one or more types of surface.

In the prior art there are examples of floor protection devices such as U.S. Pat. No. 2,942,829 disclosing a rubber cup, U.S. Pat. No. 3,333,805 disclosing a spiked foot and mating bristle mat and U.S. Pat. No. 3,326,508 disclosing a "slidable" "caster" which is receptive of a mounting spike. Similarly, there are examples in prior art dealing with articles suitable for vibration isolation such as U.S. Pat. No. 1,973,216, U.S. Pat. No. 2,535,080, and U.S. Pat. No. 3,191,896. However, none of the known prior art articles exhibit the features present in my invention, and indeed, they teach away from the basic concept and result inherent in the article described and claimed herein.

OBJECTS OF THE INVENTION

It is a principal object of my invention to provide an article offering a very high degree of protection to any surface together with high "non-slip" properties on dry, relatively firm surfaces including carpet, high polish finish, smooth plane or contoured surfaces. At the same time, isolation from vibration transmission through the article to any device attached is contemplated and offered.

An object for utilization of my invention is a vibration free and locating device for the spike of a violoncello.

It is a further object of my invention to provide a surface protective mounting for an automobile roof rack, such as to offer a high resistance to "creep" and at the same time having quick release properties and an acceptable degree of vibration isolation. While suction cups are in common use for automobile roof racks, the suction cups are frequently difficult to remove from the roof and can damage the high surface finish of the roof. These disadvantages are overcome by my invention.

Yet another object of my invention is to provide an article capable of isolating vibration and having high resistance to "creep" for use with desk type machines such as typewriters, meat grinders, food mixers, etc., also to provide vibration damping in connection with the mounting of sensitive instruments on a horizontal or inclined plane. Such a mounting does not appear to be satisfactorily met in the prior art.

Yet another object of my invention is to provide an article suited to floor protection from furniture leg or caster components, in situations requiring high traction properties.

SUMMARY OF THE INVENTION

Summarizing the invention there is disclosed, a surface protection article consisting of: a substantially rigid backing plate having front and rear surfaces, said rear surface having a means for the location of a cooperating device, said front surface having a compliant soft resilient cushion in retentive intimate contact therewith, said cushion having at least one compliant membrane portion integral therewith, said cushion and said membrane possessing mutually cooperating compressive properties upon the application of a force in the region of said means for location.

These and other aspects of the invention are more fully disclosed with reference to the accompanying drawings in which:

FIG. 1 is a plan view of a first embodiment of the invention.

FIG. 2 is a sectional view along the line "A", "A" in FIG. 1.

FIG. 3 is a plan view of a second embodiment of the invention.

FIG. 4 is a sectional view along the line "B", "B" in FIG. 3.

FIG. 5 is a sectional view similar to FIG. 2 of a third embodiment of the invention.

FIG. 6 is a sectional view illustrating optional constructional features which may be applied to any of the foregoing embodiments.

DETAILED DESCRIPTION OF THE PREFERRED EMBODIMENT

Figures 7, 8:
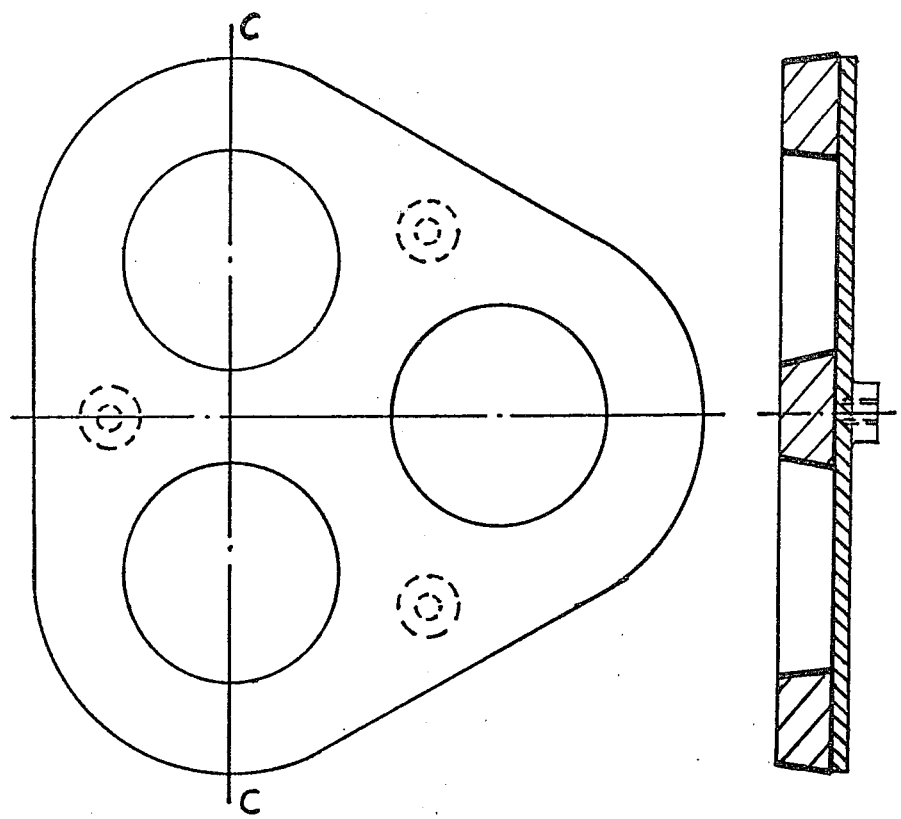
FIG. 7 is a plan view of a further embodiment of the invention showing plural cuplike apertures.
FIG. 8 is a sectional view along the line "C", "C" in FIG. 7.

In FIG. 1 and FIG. 2 numeral (1) generally indicates the preferred embodiment as related to a surface protection device for a violoncello. A rigid backing plate (2) manufactured from either wood, plastics material or metal has bonded thereon a soft complaint annular cushion (3) which may consist of commercially available synthetic foam (rubber like) material, the degree of softness being selected according to the intended use. For ordinary light loads a regular soft grade of foam is adequate.

Compliant membranes (4) and (5) are applied to the outer and inner edges respectively, of the annular ring (3) such as to provide a continuous unbroken film of membrane material. The membrane material may be of Silicone rubber and in this respect G.E. (trade mark) Silicone Rubber Sealant is found to give excellent results. The silicone rubber may be applied and cured at normal room temperature using a spatular blade or by an automated method. Curing of the Silicone rubber is normally completed in about 12 hours.

The foam cushion is bonded to the rigid backing plate (2) prior to application of the membrane, the plate having a recess (7) in its opposite face according to the intended use.

For the bonding layer (6), commercially available 3M (trade mark) No. 80010 Super Weatherstrip Adhesive is found to give satisfactory results and may be applied at normal room temperature, only to the rigid backing plate, as desired.

A taper of between 2 and 10 degrees is applied at the inner and outer edges of cushion (3) which form the boundaries thereof. While tapering of the cushion edges is not critical from an operational standpoint, such a configuration gives superior results to edges made normal to the surface of plate (2).

In actual operaton, the compliant cushion and membranes behave as dual concentric compressible cups. Thus, when an axial or an oblique force is applied at (7), the cushion and membranes compress, yielding extraordinary traction properties on any dry, relatively firm surface, together with highly protective properties for the surface and at the same time an article capable of isolating vibration inherent in a violoncello, from the playing surface. Cushion recovery from compression is immediate upon load removal.

In FIG. 3 and FIG. 4, numeral (8) refers to a threaded recess as ma be suited to a mating screw in an embodiment intended for use with an automobile roof rack. The remaining features and manufacturing details are similar to those already described.

The article shown in FIG. 3 and FIG. 4 may also be utilized for the mounting of desk machines and kitchen utensils such as typewriters, manual and motorized meat grinders, food mixers etc., providing high resistance to "creep", vibration isolation and quick release from working surface, there being no tendency to "stick" due to suction cup effect.

In FIG. 5, the recess (9) is suited to furniture leg and caster application and in addition the compliant annular cushion (10) may be assembled to backing plate (11) with or without a bonding layer according to manufacturing preference. Other features are similar to those already described.

In FIG. 6, annular cushion (12) is shown to have inner and outer peripheral surfaces (13) and (14) respectively, which are normal to the surface of backing plate (2), this being a manufacturing option.

Having thus fully described my invention and the preferred embodiment thereof, I append claims which indicate the scope of patent protection desired.

While specific materials are disclosed, it is realized that the compliant cushion for example could be replaced by foam rubber of open or closed cell construction. Also particularly in connection with FIG. 5, a composite solid and foam rubber-like material may be substituted to provide more stability to the cushion in the general region of (15).

Furthermore, areas of membrane material may be applied to the cushion face, within the scope of this disclosure.

Referring to FIG. 7 and FIG. 8, a further embodiment of the invention is disclosed in the form of a pad having plural apertures and membranes. Such an embodiment, of any configuration, has utility in combination with table lamps and telephone equipment, for example, offering surface protection together with high resistance t sliding.

Figures 9, 10:
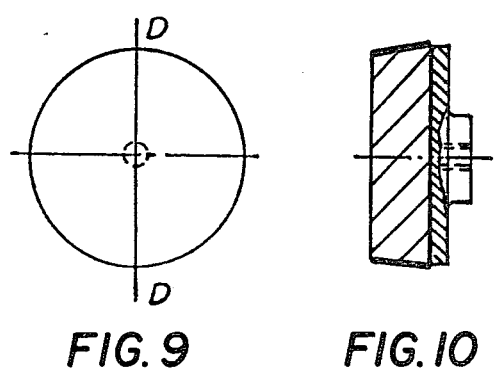
FIG. 9 is a plan view of another embodiment of the invention showing a single peripheral membrane.
FIG. 10 is a sectional view along the line "D", "D" in FIG. 9.

Referring to FIG. 9 and FIG. 10, an embodiment is shown which utilizes the basic concept of a compliant cushion and membrane, in a manner similar to the preferred embodiment, but in the form of a single peripheral membrane which meets the objects of the invention but to a lesser extent than the preferred embodiment. Such an article has utility in combination with devices requiring plural mountings of reduced diametral size. The underlying concept and materials are, however, similar to those disclosed in the preferred embodiment.

While an edge taper of 2 to 10 degrees has been discussed in connection with the preferred embodiment, this angular range may be extended to suit particular manufacturing needs even though optimum properties in the article occur in the 2 to 10 degree range.

An optional adhesive layer, (17) in FIG. 5, may be applied to locate the surface protector and a cooperating device, according to manufacturing preference, together with a well-known peelable protective medium.

The embodiments of the invention in which an exclusive property or privilege is claimed are defined as follows:

1. A surface protection device comprising: a flat substantially rigid backing plate of predetermined contour having front and rear surfaces, said rear surface having a recess means for the location of a cooperating load-source device, said front surface having a compliant soft resilient matching slab cushion in retentive intimate contact therewith, said cushion having disposed on edges thereof integral surrounding outer and annular inner thin skin-like compliant membrane portions arranged in symmetrical relationship, said outer and inner membrane portions respectively converging and diverging progressively away from said front surface of said plate at an angle between 1° and 10° with respect to an axis normal to said front surface thereby forming a pressure sensitive hollow substantially conical frustrum by means of which said cushion and said membrane portions mutually cooperate to produce high frictional properties in conjunction with a working surface when light loads are applied in a direction approximately normal to said rear surface at said recess means.

2. A surface protection device according to claim 1 wherein the cushion is a synthetic foam, rubber-like material.

3. A surface protection device according to claims 1 or 2 wherein the membrane portions are a silicone rubber material.

* * * * *